W. M. JACKSON, DEC'D.
J. M. ANDERSON, ADMINISTRATOR.
STORAGE BATTERY.
APPLICATION FILED JULY 8, 1908.
947,238.
Patented Jan. 25, 1910.
2 SHEETS—SHEET 1.
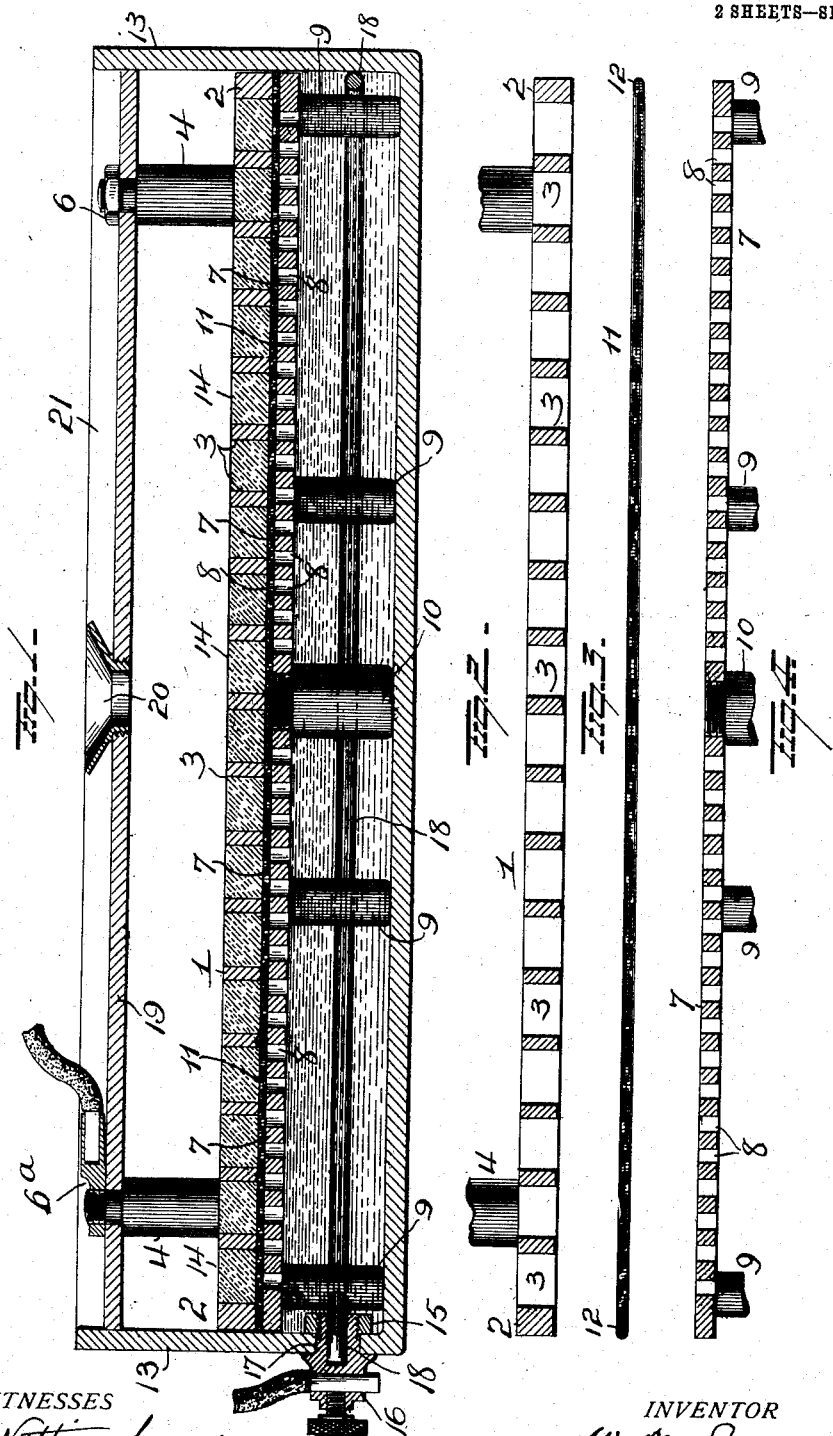

W. M. JACKSON, DEC'D.
J. M. ANDERSON, ADMINISTRATOR.
STORAGE BATTERY.
APPLICATION FILED JULY 8, 1908.
947,238.
Patented Jan. 25, 1910.
2 SHEETS—SHEET 2.
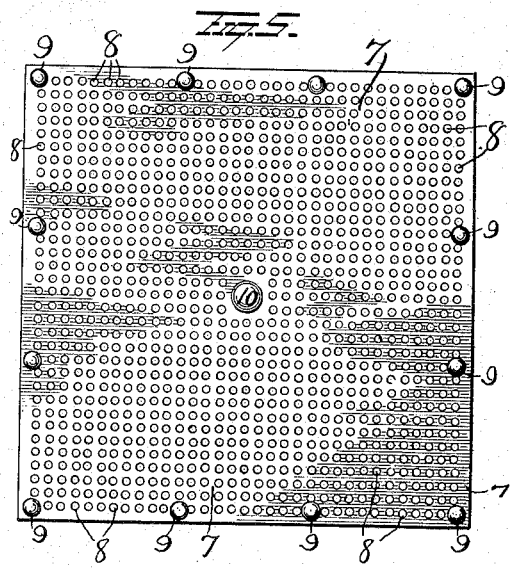
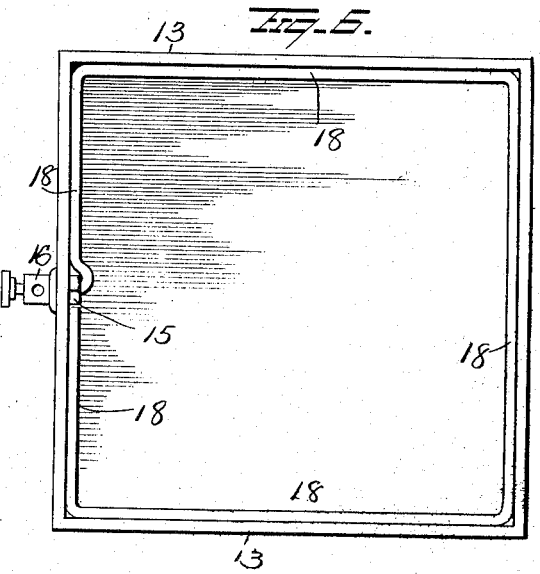
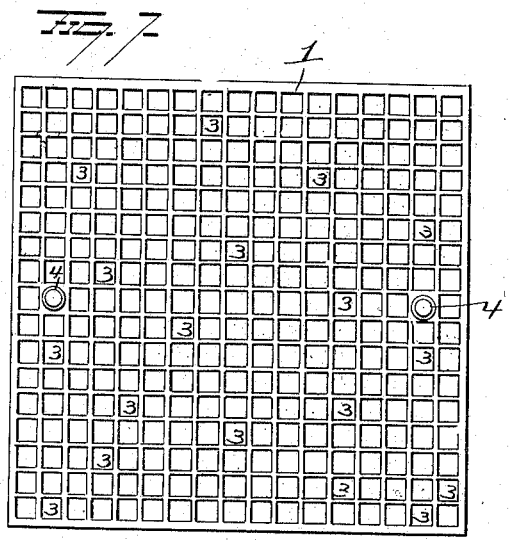
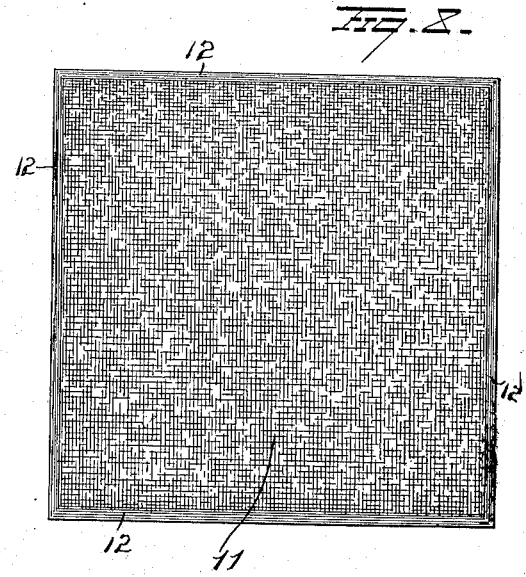
WITNESSES
E. Nottingham
G. J. Downing
INVENTOR
W. M. Jackson
By H. A. Seymour
Attorney

UNITED STATES PATENT OFFICE.

WALTER MARSH JACKSON, OF STAMFORD, CONNECTICUT, ASSIGNOR OF THREE-FOURTHS TO WALTON FERGUSON, OF NEW YORK, N. Y.; JOEL M. ANDERSON ADMINISTRATOR OF SAID JACKSON, DECEASED.

STORAGE BATTERY.

947,238.  Specification of Letters Patent.  Patented Jan. 25, 1910.

Application filed July 8, 1908. Serial No. 442,534.

*To all whom it may concern:*

Be it known that I, WALTER M. JACKSON, of Stamford, in the county of Fairfield and State of Connecticut, have invented certain new and useful Improvements in Storage Batteries; and I do hereby declare the following to be a full, clear, and exact description of the invention, such as will enable others skilled in the art to which it appertains to make and use the same.

This invention relates to improvements in storage batteries one object of the invention being to provide an organized positive element which cannot change or deteriorate, and an unorganized fluid negative element which has no particular form and which will not be disturbed by any process of disintegration by charge, discharge, action, position or idleness of the battery.

A further object is to provide two electrodes for a storage battery which shall be permanent in their conducting capacity, in their ability to perform the functions of a storage battery, and in their constant reliability to do the work required.

A further object is to so construct and organize a storage battery that it will give a maximum electro-motive force, and a higher amperage per pound of weight than has heretofore been accomplished.

A further object is to provide a storage battery in which the weight per horse-power hour will be less than twenty pounds.

With these objects in view, the invention consists in certain combinations and organizations of elements as hereinafter set forth and pointed out in the claims.

In the accompanying drawings, Figure 1 is a transverse, vertical sectional view of a storage battery embodying my invention. Fig. 2 is a view in section of the positive electrode frame; Fig. 3 is a sectional view of the asbestos mat; Fig. 4 is a sectional view showing the table which supports the positive electrode; Fig. 5 is a bottom plan view of the table; Fig. 6 is a plan view of the pan or cell with the elements removed; Fig. 7 is a plan view of the positive electrode frame, and Fig. 8 is a plan view of the asbestos mat.

In storage batteries as heretofore constructed, the positive element has been such as to undergo deterioration and disintegration, thus losing conducting capacity and eventually becoming worthless. The process of decay is gradual and the element commences to die soon after it is put into use; as the process of disintegration takes place particles fall off, and coming in contact with the negative electrode, commence a series of short circuiting, involving continuously increasing electrical leakage and battery inefficiency. As the material which forms the body or frame of such electrodes is relied upon to conduct the current, it is evidently highly objectionable that such material shall be acted upon by the working of the cell, to be constantly weakened and rendered of less and less conducting capacity. The active material in any battery which uses a lead positive is the per-oxid of lead, and no positive element has ever been discovered which will give anything like the efficiency of a per-oxid of lead electrode. It is not enough that a lead positive shall consist of the per-oxid of lead, but it must be a particular kind of per-oxid and what is known as electrolytic per-oxid. In other words, common commercial per-oxid of lead will not answer, and the per-oxid must be made by the decomposing action of an electric current of proper adaptation, upon either metallic lead, or upon some suitable salt of such metal. There are various ways of creating the proper per-oxid, but the red oxid of lead converted by electrolysis into the per-oxid offers the shortest and least expensive, most efficient and most reliable road to success. As metallic lead is acted upon by the electric current to decompose the same into the per-oxid, it is evident that if the frame or grid which is to hold the red oxid of lead, is made of metallic lead, no matter how heavy, strong or substantial its original composition, that it is only a question of time when such metallic frame or grid will be wholly converted into the per-oxid, and the strength of such frame gone together with its original conductivity. Per-oxid of lead is a much poorer conductor of electricity than metallic lead, so it is evident that the conductivity provided constantly grows less, while the integrity of the entire positive element is completely upset by disintegration and progressive weakness. The positive element of storage batteries when made of lead, is necessarily very clumsy and heavy so that its life may be lengthened as much as possible. To obviate the difficulties mentioned I construct a frame or grid, 1, no heavier than is needed to conduct the current properly in the first place and said frame is composed of metallic alloy which is not acted upon in the battery, and so preserves its strength and conducting capacity indefinitely. The alloy to be practical, must not be too brittle or too tough, must be strong, not liable to fracture, a good conductor and of such consistency that it can be machined and threads cut upon it. It must also be proof against being converted into the peroxid and otherwise safe from any mechanical, electrical or chemical change. As previously stated the per-oxid of lead is a poor conductor of electricity, while the alloy frame or grid which holds the per-oxid is a good conductor; therefore, the alloy frame must offer a very large surface contact for the per-oxid that it may make up in surface hold what it lacked in conductivity, and so conduct the current in and out with as uniform facility as the alloy frame. It is evident from this that proportions relatively, surface to weight, are important.

The alloy of which my positive electrode frame is composed, consists of desilverized lead, metallic antimony and metallic bismuth, properly fused, mixed and cast as one metal. If the mixture is properly made the cast result is a genuine alloy, which is neither lead, bismuth or antimony, but a new metal differing in all respects from any one of the three metals which compose it. This new metal has various properties, none of which can be found in any one of the three component parts. It has not the ductility of lead, or the brittleness of antimony, nor the coarse crystalline structure of bismuth. Upon fracture it resembles none of these metals, and has the appearance of fine steel. It is tough, hard, fine grained, and can be machined like brass, iron or steel. It is not brittle, though sufficiently malleable to resist violent treatment. It does not oxidize in the atmosphere, and is not decomposed into any oxid by electrolysis, or in the least acted upon by either dilute or raw sulfuric acids. It is a good conductor of electricity, can be annealed and rolled or drawn in dies as well as copper, and has great torsional and tensile strength. It runs well in molds, or in sand, and is capable of producing fine lined and handsome smooth castings. The said alloy comprises the elements stated in substantially the following proportions:—

Desilverized lead_____ 94 pounds.
Metallic antimony_____ 5   "
Metallic bismuth_____ 1   "

Each of these metals has a different fusing point, and antimony is readily decomposed by any excess of heat beyond its fusing point, therefore, a special process is necessary to insure the particular results sought. The fusing point of the new alloy itself is 640 degrees F., while the fusing point of lead is 617 degrees F., of antimony 800 degrees F., and of bismuth, 507 degrees F. As antimony decomposes beyond its fusing point, giving off black fumes, it follows that considerable care must be exercised in its manipulation. I employ three iron vessels, and fuse the metals separately. The antimony, as soon as it liquefies, must be used. The lead is superheated beyond its fusing point to 800 degrees F. The bismuth, just melted and not superheated. Pour the antimony into the lead, stir briskly with a cast-iron ladle or spoon, and follow, while stirring, with the bismuth, stirring the entire mixture over the fire for a few moments. Now pour into any suitable mold or impression on sand, and cool naturally.

My improved alloy frame, composed of the alloy above described, is cast preferably about twelve inches square and three-eighths of an inch thick having a solid rim 2 all around and divided into one-half inch square perforations 3 throughout, to within about one-fourth of an inch of its edges, the partitions or framework formed by said perforations having walls about one-eighth of an inch thick. At two opposite edges and midway between corners upwardly projecting posts are located and cast integral with the frames, said posts being preferably cylindrical half an inch in diameter, and one and a quarter inches long and centered one inch in from the edge of the frame. Either one of these posts is made the positive connection of the cell for passing the charging current in or taking the discharging current out, and both posts at the top are turned down to three-eighths of an inch in diameter to a shoulder located one inch above the surface of the frame. Upon the upper end of each post is cut a thread, the purpose of which will be explained farther on. This constitutes the entire positive electrode so far as the metallic alloy is concerned, except the engaging nuts 6, 6ª which go upon the top of the posts, one of which is a plain nut and the other an engaging nut for the positive wire connection, both made of the alloy. I now provide a base plate or table 7 preferably twelve inches square and three-sixteenths of an inch thick, made of vulcanized rubber. This table is perforated all over with closely drilled holes 8, each one-eighth of an inch in diameter, a solid center being left one inch square. The perforations extend in all directions to within half an inch of the edge, this half inch margin or border being left solid. The table is provided at its edges with cylindrical vulcanite legs or posts 9 each three-eighths of an inch in diameter, and a leg or post 10 is located at the center of the table. All the legs are of the same length. I now turn down the twelve marginal legs to a shoulder and cut threads upon them, tapping out holes so the legs will screw through the table flush. When all legs are screwed through the table to their shoulders, the distance from the under side of the table to the bottom of each leg will be uniformly one inch, therefore, all legs will be one and three-sixteenths inches long over all. Upon this table the alloy frame is to rest in the cell case, and perform its function as the positive element frame of a single battery cell. The proportions above stated may be varied more or less, if desired. The positive electrode frame is now ready to receive the active material in its perforations. I provide a mat 11 of asbestos paper the same size as that of the frame and preferably about one-sixteenth of an inch thick, and the edges of this mat are coated with silicate of soda as indicated at 12, Fig. 8. The mat 11 is laid upon a flat surface, preferably of slate and the flat face of the frame is placed squarely upon it. I then make a mixture of the red oxid of lead with chemically pure sulfuric acid and water, in the proportion of one fluid ounce of acid to ten fluid ounces of distilled water, until the mass is thoroughly mixed and uniform, mixing with a glass spoon or stone pestle. When perfectly mixed to the consistency of a thick paste I spread the mass upon the frame with a steel spatula, working the material into all the open squares of the frame until they are uniformly filled solid, with no cavities or blow holes. I then scrape off flush and clean and lay the frame aside upon a series of edged surfaces to dry for twenty-four hours naturally. Although the positive element is now mechanically organized, it would show no electro-motive force if put in cellular form, as the red oxid of lead is not an active electrical material; it must be converted into per-oxid of lead. Commercial per-oxid will not give the result that the red oxid gives when the latter is converted into the per-oxid by electrolysis. In other words we must have electrolytic per-oxid, or our cell will fail. There are two ways of securing the desired result. We may organize each cell complete and then by a charging current convert the red oxid into the per-oxid, or form the cell already organized. When the former method is adopted, the cell is fully organized, filled with the electrolytic fluid, both positive and negative electrodes in place; the cell sealed and so shipped to the purchasing party. It can readily be seen that this would be very objectionable because the cell would have to be maintained in a vertical position during transportation to prevent the fluid from being spilled, also to prevent the fluid negative electrode from being distributed all over the case. The method of forming the positive electrode in the cell is complicated, requires much care and skill and is liable to prove ineffective, if not done exactly right. I prefer therefore the independent formation as it is far more practical in every sense.

The pan or cell case 13 to contain the elements of the battery is preferably made of vulcanized rubber and about twelve inches square, its depth being about three inches. The vulcanite table 7 is located within the pan or cell case, and supported above the bottom of the latter by means of the legs 9—10. The positive electrode frame 1 containing the active material 14 is supported by the table 7, with the asbestos mat interposed between them. It will of course be understood that a slight clearance will be provided between the edges of the frame, table and mat and the walls of the pan or cell case. The cell case is provided in one wall near its base with a hole for the accommodation of a connecting device comprising a binding post 16 having a plug 17, and a nut 15 screwed on the inner end of said plug. A naked copper wire 18, preferably about three-sixteenths of an inch in diameter and amalgamated with mercury, extends around the inner walls of the pan or cell case between the table and the bottom of the cell case,—said wire having one end electrically connected with the plug 17 and constituting the negative conductors of the battery.

The negative electrode employed has no particular organized form or shape, but is a fluid which will lie flat upon the floor of the cell case, flowing from one side to the other or in any direction accordingly as the cell is worked vertically or at considerable of an angle. This fluid electrode is a good conductor of electricity and makes contact with the amalgamated conducting negative copper wire 18 which surrounds the case near its bottom. No matter what the incline of the cell or how much it may be jolted, the electrical negative contact is always full and perfect. The fluid electrode is composed of electrolytic metallic zinc and ordinary commercial mercury in the proportions of one part of zinc to four parts of mercury by weight. A single pound of zinc by electrical oxidation and deoxidation, as illustrated in my battery by the action of the discharge and charge, can furnish but one horse power electric; therefore to realize a full available horse power mechanically I must employ more than a single pound of zinc. The zinc and mercury in the proportions given are mixed and form a fluid amalgam which is poured into the bottom of the case and constitutes the active and permanent negative electrode. The fluid electrolyte in which the electrodes are submerged is a solution of chemically pure sulfuric acid and distilled water, in the proportions of one fluid ounce of acid to five fluid ounces of water.

In the method of forming the positive electrode within the cell, the electrolytic fluid is not a solution of sulfuric acid and water, but a saturated solution of pure sulfate of zinc in distilled water, and the fluid negative electrode is not an amalgam of zinc and mercury, but merely mercury without zinc. I proceed as follows:—Pour into the cell case six pounds of mercury and locate the vulcanite table firmly on the bottom, legs down. Now place the positive electrode frame with its red oxid of lead filling, flat side down, upon top of the table, the two posts 4 projecting upwardly. A cover 19 of vulcanite is placed within the top of the case, and this cover has three holes drilled through it, one central and one central at each end corresponding to the upright posts of the positive electrode frame. The center hole is tapped out to secure a vulcanite funnel 20 which screws into said hole from the top to a shoulder and is screwed down close in copal varnish. The posts of the positive electrode frame pass up through the holes provided, and the cover is placed in position and pushed down until it rests against the shoulders on the posts of the positive electrode frame. This leaves a counter sunk space 21 all over the top of the cover, one-quarter of an inch deep. A nut 6 made of the alloy is placed on one of the posts 4 and a binding nut 6$^a$ of alloy is secured to the other posts 4, for the attachment of a leading-in wire. The saturated solution of sulfate of zinc may be poured into the case before the cover is put on or afterward through the funnel in the cover. The sulfate of zinc solution should fill the case to within half an inch of the under side of the cover. The cell is now ready for forming and a number of such cells may be connected in series or in parallel. If fifty such be employed, they will be included in circuit with a source of electric energy of one hundred and sixty volts and ten amperes. Continue the current for forty-eight hours without cessation—once in four hours during the process examine the cells as to fluid height and pour in enough sulfate of zinc solution to make up the loss, or if there is no loss, but a gain, suck out with a syringe half a pint from each cell, and fill up with the sulfate of zinc solution. At the end of forty-eight hours all the red oxid of lead should be converted into electrolytic per-oxid and a pound and half of metallic zinc will be precipitated from the sulfate solution while sulfuric acid will be manufactured in the cell, and leave a solution of acid one part to water five, and thus the amalgam negative electrode will be manufactured and the acid electrolyte produced. The battery is now formed and ready for discharge and work. It will not reach its full degree of efficiency until it has been charged and discharged several times. The forming current above described is an entirely different matter from subsequent charging currents.

The battery as described, after full formation, will give one available mechanical horse-power of one thousand watts per hour or one kilowatt electric. So the whole fifty cells will give fifty horse power hours duty available. Seven hundred and forty-six watts per hour constitute an electrical horse-power, but this is not available for work because of losses on the line and inefficiency of motors. One thousand watts per hour are needed from the battery to realize a horse-power hour work, and I provide for this work and duty. The battery once formed is capable of a very high rate of discharge and consequently capable of being charged at a corresponding high rate. I may have one horse-power for fifty hours, or two horse for twenty-five, and so on up to the maximum safe delivery which is ten horse-power for five hours. I may always charge at the maximum rate of delivery, or at the rate of ten horse-power per hour for five hours. As the battery can be discharged at the rate of ten thousand watts per hour, it is evident that the discharging current can never be greater than eight-five amperes per hour. As the working voltage of a cell is two and thirty-seven one-hundredths of a volt, it follows lows that fifty cells connected in series will give a current of one hundred and eighteen and a half volts, which multiplied by eighty-five amperes, gives ten thousand, seventy-two and a half watts. The battery may be charged, after formation in five hours with a current of one hundred and sixty volts and seventy amperes, which would put in eleven thousand two hundred watts, twelve hundred watts less would result, and this constitutes the efficiency of the battery, which is ninety per cent. There is no special difference in the electrical result, whether the positive electrode is formed within the cell as described, or whether it is formed outside the cell, and the rule of charge and discharge is the same in both cases after formation has taken place.

The formation of the positive electrode outside the cell consists in converting the red oxid of lead into electrolytic per-oxid before the positive element is placed in the cell at all; thus when it is located, the cell is ready for duty at once without charging at all. Under these circumstances the zinc-mercury amalgam is placed in the bottom of the cell before the formed positive electrode is located and the cell is filled with the sulfuric acid electrolyte, and not with a sulfate of zinc solution. In this way any number of positive electrodes may be made up and kept in stock ready to put into cells at a moment's notice. But such electrodes must be kept, after forming, submerged in water. It does no harm to leave the formed electrode out of the water for ten days or so, but the longer it remains dry the less efficient it will be when submerged in the cell for duty and the first discharge will fall that much short of full cellular capacity. The full duty returns as the battery is worked and the positive electrode is not permanently injured by drying, unless the drying period is protracted, in which case the electrode might perform very little service until after a regular full charge was carried into it. To produce a regular electrolytic per-oxid of lead, it is necessary to treat the red oxid of lead in the electrode as if it were the element of a regular cell and a forming current of electricity is necessary, working through a fluid electrolyte and a negative electrode. I construct a number of forming cells, having no covers. They are made something like those previously described so far as cases are concerned but have a different negative connection and do not use a fluid negative electrode or zinc or mercury. The cases are of the same height and width but are constructed three inches longer. The negative electrode employed is made of the metallic alloy and cast the desired shape, which is three-eighths of an inch thick, twelve inches, scant, wide and fifteen inches, scant, long, having a single upright post central at one end, the post being half an inch square and extending one inch above the top of the case, a thread cut upon it to receive a binding thumb screw to which the negative wire is attached. This alloy plate is cast with open square spaces same as the positive electrode previously described. I lay this plate upon a flat surface preferably of slate and prepare a paste made of fresh yellow oxid of lead or litharge, mixed with dilute sulfuric acid same as I prepared the red oxid of lead for the positive plate. I use no asbestos paper spread over the lower surface of the plate and simply fill all the open spaces with the yellow lead paste and let it dry twenty-four hours naturally. The plate is then placed in the bottom of the cell case and a vulcanite table like those described placed upon it. The positive red lead plate is put upon the table and the cell case filled up with an electrolyte composed of one fluid ounce of chemically pure sulfuric acid and nine fluid ounces of distilled water. The positive and negative connections now appear at the open top of the cell. Arrange fifty forming cells in this way, connect in series and put on a charging current of one hundred and forty volts and fifteen amperes and continue the charge for forty-eight hours. At the end the positive elements will be formed, and all their red oxid of lead converted into electrolytic per-oxid. Remove the positive elements, wash thoroughly in cold and running water. Submerge in cold water, and they are ready at any time to go into the lead-zinc commercial battery.

By this process, we may ship cells any distance, sending with each cell a vessel of the electrolyte holding the exact quantity desired, also a package containing the exact quantity of zinc, mercury amalgam; the cover, the table and a piece of paraffin wax, with printed instructions how to assemble. In this way a battery is put together and as soon as connected is ready for duty, no charging or forming being required. In other words, the battery is ready for its discharging function at once without any further ceremony. Under these circumstances, the zinc, mercury amalgam is poured in; the table is located; the positive electrode is seated upon the table; the electrolyte is poured in; the cover is applied and the countersunk space at top of cover is filled with melted paraffin wax; a marble or other closing device put in the funnel; the positive and negative wires connected and the battery is instantly ready for discharge duty. One of my zinc lead cells will show two and a half volts electro-motive force upon standing test for voltage, will discharge at a nearly uniform rate of two and thirty-seven one-hundredths volts and will react against the charging current with very nearly three volts or two and nine-tenths. This reactionary voltage is so great that in charging, the electro-motive force of the charging current must always be greater than three volts per cell; for this reason I employ for charging a fifty cell battery, a current of one hundred and sixty volts and seventy amperes. The charging current may be higher in voltage, provided the amperes are reduced proportionately, for instance, a three hundred and twenty volt current may be used, and thirty-five amperes, the number of watts being the same in both cases. It takes the same length of time to charge in both cases for the reason that the same number of watts, enter the cell.

Having fully described my invention what I claim as new and desire to secure by Letters-Patent, is:—

1. A storage battery comprising a container, an electrolyte and two electrodes, one of said electrodes being a fluid, and the other electrode comprising a frame containing active material, said frame being of a material which will not be decomposed by the electrolyte.

2. A storage battery comprising a container, an electrolyte and two electrodes, one of said electrodes comprising an alloy frame which will not be decomposed by the electrolyte, and active material carried by said frame, and the other electrode consisting of mercurial fluid.

3. A storage battery comprising a container, an electrolyte, a frame having receptacles containing active material, said frame being an alloy of lead, metallic antimony and metallic bismuth, and constituting with the active material one electrode of the battery, and a mercurial fluid constituting the other electrode of the battery.

4. An electrode for a storage battery consisting of an alloy of lead, metallic antimony and metallic bismuth made in the form of a frame having receptacles, and active material in said receptacles.

5. A storage battery comprising a container, a fluid electrode in said container, an acid electrolyte, and an electrode comprising an alloy frame which is not decomposable, and lead per-oxid carried by said frame.

6. A storage battery comprising a container, an acid electrolyte therein, an electrode comprising mercury and zinc in a liquid state, and an electrode comprising a frame which is not decomposable and lead per-oxid carried by said frame.

7. A storage battery comprising a container, an acid electrolyte therein, a perforated non-metallic table supported above the bottom of said container, a fluid electrode below said table, and an electrode supported over said table and comprising a frame which is not decomposable, and having receptacles containing active material.

8. A storage battery comprising a container, an acid electrolyte therein, a perforated table of non-conducting material supported above the bottom of the container, an electrode comprising mercury and zinc below said table, and an electrode supported over said table, said last-mentioned electrode comprising a perforated frame made of material which is not decomposable, and lead per-oxid contained in the perforations of said frame.

9. A storage battery comprising a container, a conductor within said container parallel with the lower portions of the walls thereof, means for connecting said conductor in an electric circuit, a fluid electrode in electrical contact with said conductor, a perforated table of non-conducting material, an electrode supported over said table and comprising a frame made of material which is not decomposable, and having openings containing per-oxid of lead, means for connecting said electrode frame in an electric circuit, and an acid electrolyte.

10. A storage battery comprising a container, an acid electrolyte, a fluid electrode comprising mercury and zinc, a perforated table of insulated material supported above the bottom of the container, an electrode comprising a perforated frame of material which is not decomposable and containing lead per-oxid in its perforations, said electrode supported over the perforated table, an asbestos mat interposed between said electrode and the table, and means for including said electrodes in an electrical circuit.

11. A storage battery comprising a non-corrodible container, a cover therefor, a non-corrodible perforated table supported horizontally above the bottom of the container, an electrode frame composed of material which is not decomposable and having receptacles containing lead per-oxid, said electrode frame supported horizontally over the perforated table, posts connecting said electrode frame and cover, legs supporting the table, a fluid electrode below the table, and means for including the two electrodes in an electric circuit.

In testimony whereof, I have signed this specification in the presence of two subscribing witnesses.

WALTER MARSH JACKSON.

Witnesses:
A. G. JACKSON,
J. GIBSON.